United States Patent Office 2,732,398
Patented Jan. 24, 1956

2,732,398

FLUOROCARBON SULFONIC ACIDS AND DERIVATIVES

Thomas J. Brice and Paul W. Trott, St. Paul, Minn., assignors to Minnesota Mining & Manufacturing Company, St. Paul, Minn., a corporation of Delaware No Drawing. Application August 9, 1954,
Serial No. 448,784

10 Claims. (Cl. 260—503)

This application is a continuation-in-part of our copending application S. N. 334,083, filed January 29, 1953.

This invention relates to our discovery of a new and useful class of reactive fluorocarbon compounds having unique properties, namely, to saturated fluorocarbon sulfonic acids and derivatives. This invention also relates to our discovery of a general process of making saturated fluorocarbon sulfonic acid fluorides, which provide novel starting compounds from which the acids and other sulfonyl compounds can be made.

The novel perfluorinated compounds claimed herein have in common a fluorocarbon sulfonyl group wherein a saturated and stable fluorocarbon structure (consisting of 1 to 18 perfluorinated carbon atoms) is directly bonded to the hexavalent sulfur atom of a sulfonyl group. This sulfur atom is linked by bivalent bonds to the two oxygen atoms of the sulfonyl group and is also linked to an oxygen atom, a nitrogen atom, a fluorine atom or a chlorine atom, in providing the various types of complete compounds claimed herein.

These compounds are the saturated fluorocarbon sulfonic acids, and the corresponding acid anhydrides, metal and ammonium salts, acid fluorides and chlorides, and sulfonamides; each of which provides an inorganic sulfonyl functional group at one end of the molecule, directly united to the fluorocarbon structure that provides the remainder of the molecule. All of these compounds are highly stable.

The saturated fluorocarbon structure is highly stable and inert. When this group contains five or more carbon atoms it provides the molecule with a fluorocarbon "tail" which is both hydrophobic and oleophobic and which imparts marked surface active properties to the molecule. Both water-solubility and oil-solubility of the complete compounds decrease with increase in the number of carbon atoms. In the presently claimed compounds, the saturated fluorocarbon structure contains 1 to 18 fully fluorinated (perfluorinated) carbon atoms, each of which is present in a perfluoroalkyl or a perfluorocyclohexyl group. The complete fluorocarbon structure may be a perfluoroalkyl group having an open (acyclic) straight-chain or branched-chain structure ($C_nF_{2n+1}$—), or it may be a perfluorocyclohexyl group having a six-membered ring structure ($C_6F_{11}$—), or it may consist of a hybrid combination of perfluoroalkyl and perfluorocyclohexyl groups. The sulfur atom of the molecule can be bonded to either a cyclic or an acyclic carbon atom (that is, this carbon atom may or may not be in a ring). In a fluorocarbon structure two carbon atoms may be linked together by an oxygen atom, or three carbon atoms may be linked together by a nitrogen atom, since oxygen and nitrogen provide very stable linkages between fluorocarbon groups and do not interfere with the highly stable and inert character of the complete fluorocarbon structure (as is shown, for instance, in U. S. Patents Nos. 2,500,388 and 2,616,927).

To avoid the inconveniences of novel nomenclature, the names of fluorocarbon groups and compounds are based on names used in the hydrocarbon system of conventional organic chemistry for groups and compounds of corresponding structure, and the prefix "perfluoro" is employed to denote substitution of all carbon-bonded hydrogen atoms by fluorine atoms, in accord with recognized usage (cf., Chemical and Engineering News, issue of October 27, 1952, page 4514). This usage carries no implication of similarities in properties between corresponding groups and compounds of the hydrocarbon and fluorocarbon systems, being a mere matter of nomenclature. Hydrogen and fluorine are not equivalent or similar.

Using the symbol "$R_f$" to represent the saturated fluorocarbon structure, containing 1 to 18 perfluorinated carbon atoms, our perfluoro sulfonic acids can be represented by the following generic structural formula:

which can be abbreviated as:

These acids may be regarded as derivatives of sulfuric acid wherein one of the two hydroxyl groups has been replaced by a fluorocarbon group.

The corresponding anhydrides of these acids (wherein two fluorocarbon sulfonyl groups share a common oxygen atom) are represented by the formula:

$$(R_fSO_2)_2O$$

The corresponding metal and ammonium salts of these acids are represented by the formula:

where "M" is the metal atom or ammonium group which replaces the hydrogen atom, and $m$ is the number of sulfonyl groups bonded thereto (which is unity in the case of a monovalent M, such as sodium or ammonium).

The corresponding sulfonic acid fluorides (sulfonyl fluorides), which differ from the acids in having a fluorine atom in place of the hydroxyl group, are represented by the formula:

The corresponding sulfonic acid chlorides (sulfonyl chlorides), which differ from the acids in having a chlorine atom in place of a hydroxyl group, are represented by the formula:

The corresponding amides of these acids (sulfoamides), which have an amido group in place of the hydroxyl group, are represented by the formula:

These types of compounds are closely related and constitute a natural grouping in chemical classification. They can all be represented by the generic formula:

where the "X" inorganic substituent is a sulfur-bonded hydroxyl group (OH) in the case of the acids, or is an oxygen atom (O) (linked to another sulfonyl group) in the case of the anhydrides, or is a salt group (OM) (it being understood that in the case of salts of polyvalent metals the metal atom may be joined to more than one sulfonyl group), or is a fluorine atom (F) or chlorine atom (Cl) in the cases of the acid fluorides and chlorides, or is an amido group (NH$_2$) in the case of the sulfonamides. Thus in every case the sulfur atom of the sulfonyl group is united directly to a fluorocarbon group and to an oxygen, nitrogen, fluorine or chlorine atom, and the fluorocarbon group or "tail" is provided with a reactive inorganic "head."

In our process of preparation using starting compounds of the hydrocarbon series of conventional organic chemistry, the perfluoro sulfonyl fluoride compound ($R_fSO_2F$) is prepared by the electrochemical fluorination in anhydrous liquid hydrogen fluoride of an appropriate hydrocarbon sulfonyl halide ($RSO_2Y$, where "Y" is F, Cl, Br or I, and "R" is the hydrocarbon group), thereby replacing all of the hydrogen atoms of the latter by fluorine atoms, adding fluorine to cause saturation when the starting compound is unsaturated, and replacing the chlorine, bromine or iodine, if present, by fluorine. The perfluoro sulfonyl fluoride product can be readily converted to the potassium or sodium salt ($R_fSO_3M$) by hydrolysis in hot alkali solution; and the salt can be readily converted to the perfluoro sulfonic acid ($R_fSO_3H$) by hydrolysis in strong acid solution, as by distillation from 100% sulfuric acid. These sulfonic acids are strong salt-forming acids and other salts can be readily prepared by reaction of the acid with the metal oxide or the metal or ammonium hydroxide. The anhydrides of the acids can be prepared by heating the acid with phosphorous pentachloride ($PCl_5$) in a 2:1 mol ratio, preferably using an excess of $PCl_5$ to obtain the highest yield. The acid chlorides can be prepared by reacting the acid with $PCl_5$ or with $PCl_5 \cdot 2ZnCl_2$ complex in approximately equimolar ratio, or by reacting the acid anhydride with aluminum chloride. The sulfonamides can be prepared by reacting the acid fluoride or chloride with liquid ammonia.

All of the above-mentioned types of perfluorinated product compounds are water-insoluble except for the acids and salts.

Our fluorocarbon sulfonic acids have unique combinations of properties not possessed by any previously known acids, organic or inorganic.

They are extremely strong acids. They are stronger and much more stable than the hydrocarbon sulfonic acid analogues of conventional organic chemistry. As compared to the corresponding perfluoro carboxylic acids, they are stronger, more soluble, much higher-boiling, less volatile and more stable at elevated temperatures in aqueous solutions, and their salts are stable at much higher temperatures.

The lowest acids of the present series, trifluoromethanesulfonic acid ($CF_3SO_3H$) and pentafluoroethanesulfonic acid ($CF_3CF_2SO_3H$), which are liquid at room temperature, have particular utility as very strong, non-oxidizing, stable acids that are miscible with water in all proportions and are highly soluble in oxygenated organic solvents, such as alcohols and ethers. They are soluble in acetone and ethyl acetate but cause discoloration. They are only slightly soluble in non-polar solvents, such as carbon tetrachloride, benzene, heptane, and fluorocarbons. These acids have value as acid catalysts, in lieu of sulfuric acid, trifluoroacetic acid and its anhydride, and HF, for example. They can be used as intermediates in chemical syntheses. The salts of these acids are stable at high temperatures. The anhydrous sodium salt of trifluoromethanesulfonic acid ($CF_3SO_3Na$) melts at about 300° C. and is relatively stable to decomposition at temperatures up to about 400° C. The anhydrous sodium salt of pentafluoroethanesulfonic acid ($CF_3CF_2SO_3Na$) melts at 370–390° C. and is relatively stable to decomposition at temperatures up to about 420° C.

The potassium salts of these acids, $CF_3SO_3K$ and $CF_3CF_2SO_3K$, are extremely stable and thus resemble inorganic salts of strong mineral acids, but they exhibit the unique property of being relatively low-melting and having a long liquid range (i. e., a long temperature range between the melting and decomposition temperatures). Thus the $CF_3SO_3K$ salt has a melting point of about 230° C. and does not decompose at a substantial rate until a temperature of at least 375° C. is reached. The $$CF_3CF_2SO_3K$$

salt melts at about 280° C. and does not decompose at a substantial rate until a temperature of at least 425° C. is reached. These potassium salts have valuable fields of utility based upon possessing this unique property in combination with other properties. They can be employed as fusible fluxes and bonding agents. The molten salts are highly fluid and stable and can be used as heat exchange liquids and to provide baths for quenching metals. Use of these salts as high temperature lubricants for special applications is also indicated.

The higher acids of the present series, and their salts (particularly the potassium and sodium salts) and amides, in addition to having utility as intermediates for chemical syntheses, have notable utility as anionic surface active agents ("surfactants"). This surface active property is markedly developed when the molecule contains five or more carbon atoms, and is of particular value when there are seven or more carbon atoms in the molecule. The n-perfluorooctane compounds, which have a normal chain of eight perfluorinated carbon atoms, $CF_3(CF_2)_7-$, are of particular noteworthy value as surface active agents and as starting compounds for making surface active compounds. These acids as normally prepared and used are solid at room temperature. Some of these acids are liquid when in a rigorously anhydrous state, but they are highly hygroscopic and the presence of a small amount of water renders them solid. The substantial fluorocarbon "tail" in these molecules is highly inert and stable and is both hydrophobic and oleophobic, resulting in low solubility in carbon tetrachloride, hydrocarbons and oils, and in diminishing solubility in water and other oxygenated solvents as the fluorocarbon tail becomes longer and increasingly overcomes the solubilizing action of the sulfonyl group at the other end of the molecule. These acids and their salts are stably effective in reducing the surface tensions of aqueous and non-aqueous solutions even under strongly oxidizing and reducing conditions, even at elevated temperatures, and even in the presence of strong mineral acids and of high concentrations of base. (Reaction of an acid to form a salt in basic solutions, or of a salt to form an acid in acidic solutions, does not materially affect surface activity since both the acids and the salts are surface active and provide the same anions in aqueous solutions.) These acids and salts have value for this purpose even under conditions where the perfluoroalkyl carboxylic acids and salts are ineffective owing to insufficient solubility, or too rapid volatilization, or decarboxylation.

In connection with use as surface active agents, one of the most striking distinctions over the sulfonic acids and derivatives of the hydrocarbon system is that the latter require much longer chain lengths, they are not usefully stable in strongly oxidizing solutions (particularly hot acidic oxidizing solutions), and they are not markedly useful in oils and in hydrocarbon media since the hydrocarbon chain is oleophilic and renders the molecule increasingly oil-soluble with increase in chain length. The higher acids of our series have strong surface activity in oils and hydrocarbon media, notably the n-perfluorooctanesulfonic acid.

These higher perfluoro sulfonic acids and derivatives have surface active properties rendering them suitable (depending on the particular system) for use as surface tension reducing agents, wetting agents, foaming agents, anti-foaming agents, dispersing agents, emulsifying agents, stabilizing agents for emulsions and dispersions, detergents, corrosion inhibitors, fluxes, and as surface treating and coating agents that are adsorbed on the substrate surface with the fluorocarbon tails projecting outwardly to provide an exposed inert fluorocarbon surface that is non-polar and is both oleophobic and hydrophobic.

The unique properties of the present compounds are due not only to the presence of fluorinated carbon atoms but also to the absence of carbon-bonded hydrogen. In particular, the presence of even a single hydrogen atom on a terminal carbon atom of the fluorinated carbon group has a marked effect on solubility and surface tension properties and on stability, owing to the fact that hydrogen is electropositive whereas fluorine is strongly electronegative. The combination of both kinds of atoms on a terminal carbon atom changes the properties of the molecule, resulting in an exposed polar instead of a non-polar group (with the result that the molecule then has a polar group at each end), opportunity for dehydrofluorination, and a point of attack for chemical reactions.

The present compounds may be used in making other fluorocarbon derivative compounds thereof, such as the acid bromides and iodides, amine salts, sulfones, esters, substituted sulfonamides, and chloramides.

PROCESS OF MAKING

We have discovered that our compounds can be made in good yields by utilizing a novel electrochemical process to produce the saturated perfluoro sulfonyl fluoride compounds, from which the sodium and potassium salts can be made by hydrolysis in hot alkali solutions, and these salts can be easily converted to the perfluoro sulfonic acids by hydrolysis in strong acid solutions, as by distillation from 100% sulfuric acid. The sulfonic acids can be conveniently employed in making these as well as the other salts, and the acid anhydrides and the acid chlorides; while the sulfonamides can be prepared directly from the sulfonyl fluorides or from the sulfonylchlorides as previously indicated.

The key to this preparatory route is the electrolyzing of a mixture of anhydrous liquid hydrogen fluoride and an appropriate hydrocarbon sulfonyl halide starting compound (saturated or unsaturated) to provide a perfluorinated product having a saturated fluorocarbon group bonded to a sulfonyl fluoride group in the molecule. The starting compound is soluble in the liquid HF and provides adequate conductivity.

It might have been supposed that hydrocarbon sulfonic acids could be usefully employed as starting compounds for electrofluorination to produce fluorocarbon sulfonyl fluorides, but the isolated products were found to be largely cleavage products in which the carbon-sulfur bond had been broken, so that the sulfur was recovered as $SO_2F_2$, $SF_6$, etc., and the fluorinated hydrocarbon groups were recovered as fluorocarbons. Attempts to make the present fluorocarbon sulfonic acids from the corresponding fluorocarbon monocarboxylic acids, by chemical synthesis, met with failure. The best procedure known to us is the one based on our discovery of employing electrofluorination of hydrocarbon sulfonyl halides in liquid hydrogen fluoride.

The saturated fluorocarbon sulfonyl fluoride product of the electrochemical process has the same carbon-sulfur skeletal structure as the starting compound, or an isomeric structure, but the hydrogen atoms have been replaced by fluorine atoms, and in the case of sulfonyl chloride, bromide and iodide starting compounds the chlorine, bromine or iodine is replaced by fluorine. Unsaturated starting compounds can be used, such as aryl sulfonyl halides, and in this case the fluorination process also results in fluorine addition to cause saturation—thus the aryl group becomes a perfluorocyclohexyl group. By-products containing fewer carbon atoms than the starting compound are also formed due to the cleavage of carbon-carbon bonds in some molecules, and cleavage also results in the formation of non-cyclic by-product compounds when cyclic starting compounds are used. This electrochemical process is not limited to the making of compounds containing up to 18 carbon atoms in the molecule but can be employed in making still higher fluorocarbon sulfonyl fluoride products.

The electrochemical process can be employed with appropriate starting compounds in making fluorocarbon sulfonyl fluoride products which have a stable ring structure other than cyclohexylic, for instance compounds containing a perfluorinated five-membered or seven-membered carbocyclic ring in the sulfonyl fluoride molecule. Likewise, polycyclic saturated sulfonyl disulfonic naphthalene compounds to produce perfluorinated naphthalane disulfonyl and monosulfonyl fluorides, including those that retain a fused ring structure. Thus naphthalenedisulfonyl chloride, $C_{10}H_6(SO_2Cl)_2$, can be used for making perfluoronaphthalane disulfonyl and monosulfonyl fluorides, from which the corresponding salts and acids can be made.

The starting compounds need not have a strictly hydrocarbon structure bonded to the sulfur atom or atoms of the molecule, since the fluorination process will also replace side atoms and groups other than hydrogen with fluorine (e. g., chlorine and hydroxyl substituents). The starting compound may contain an oxygen atom linking two carbon atoms, or a nitrogen atom linking three carbon atoms, and these linkages will be retained in the corresponding stable fluorocarbon structure of the product, as previously indicated.

As mentioned, use can be made of sulfonyl chlorides, bromides and iodides as starting compounds which are mixed with the liquid hydrogen fluoride. The sulfonyl chlorides do not readily react with the latter to become sulfonyl fluorides (as shown by the fact that they can be recovered unchanged after being dissolved in liquid hydrogen fluoride) but replacement of the chlorine by fluorine occurs under the conditions of cell operation. Use of sulfonyl fluorides as charging compounds, which are added to the liquid hydrogen fluoride, is the preferred practice from the standpoint of obtaining the highest yields of the corresponding perfluoro sulfonyl fluoride products.

The perfluorinated and saturated fluorocarbon sulfonyl fluoride product is insoluble in liquid hydrogen fluoride and will either evolve in admixture with the hydrogen and other cell gases or will settle to the bottom of the cell in admixture with other products, depending on the volatility of the particular compound and the fluoride compounds containing a fused ring structure can be made by electrofluorination of naphthalene and phenanthrene sulfonyl halides, for instance using naphthalenesulfonyl chlorides to obtain perfluoronaphthalanesulfonyl fluorides, as well as by-product fluorocarbon sulfonyl fluorides resulting from ring cleavage of perfluorinated molecules. (The term "naphthalane" is used in naming the perfluorinated product compounds to indicate that the original naphthalene structure has been saturated.)

The electrofluorination process is not limited to the use of monosulfonic starting compounds. Polysulfonyl halide starting compounds can be used to obtain perfluorinated polysulfonyl fluoride analogues, as well as monosulfonyl fluoride compounds which retain only one of the sulfonyl groups owing to cleavage of the other sulfonyl group or groups. Thus decane 1,10-disulfonyl chloride, $(CH_2)_{10}(SO_2Cl)_2$, can be used as the starting compound to produce a mixture of perfluoro(decane 1,10-disulfonyl) fluoride, $(CF_2)_{10}(SO_2F)_2$, and perfluorodecanesulfonyl fluoride, $CF_3(CF_2)_9SO_2F$, which can be separated by fractional distillation, and can be converted to the corresponding salts and sulfonic acids. Benzenedisulfonyl chloride can be used to make perfluorocyclohexanedisulfonyl fluoride, $C_6F_{10}(SO_2F)_2$, and perfluorocyclohexanesulfonyl fluoride, $C_6F_{11}SO_2F$, which can be converted to the corresponding salts and sulfonic acids. Diphenyldisulfonyl chloride can be used to make bis(perfluorocyclohexanesulfonyl fluoride), $$(C_6F_{10})_2(SO_2F)_2$$

and bis(perfluorocyclohexane)sulfonyl fluoride, $$F(C_6F_{10})_2SO_2F$$

from which the corresponding salts and sulfonic acids can be made. Similarly, use can be made as starting compounds of operating conditions. It can be recovered from the mixture by fractional distillation. It need not be recovered as such but can be recovered by treatment of it to a mixture containing it to provide a derivative (a salt, for instance) that is isolated in crude or purified form and which may, in turn, be used for making a further derivative, so that in any event the sulfonyl fluoride cell product is recovered as a useful reaction product of the process.

The equipment and operating procedures used in the electrochemical fluorination process have been described in the U. S. patent of J. H. Simons, No. 2,519,983 (August 22, 1950), and in a paper by E. A. Kauck and A. R. Diesslin published by the American Chemical Society in Industrial and Engineering Chemistry, vol. 43, pp. 2332–2334 (October 1951). Photographs of a 50-ampere laboratory cell and of a 2000-ampere pilot plant cell appear on pages 417–418 of the book "Fluorine Chemistry," edited by J. H. Simons (published by Academic Press Inc., New York, 1950). A simple type of single-compartment cell without diaphragms can be used, having an electrode pack consisting of alternating and closely-spaced iron cathode plates and nickel anode plates, contained in a closed steel vessel provided with a cooling system, and with inlet and outlet connections for introducing charging compounds and for withdrawing gaseous products from the top and liquid products from the bottom. The cell can be conveniently operated at temperatures in the neighborhood of 0 to 20° C. and at substantially atmospheric pressure, or at higher temperatures and pressures. The exit gas mixture is passed through a refrigerated condenser to condense out most of the HF vapor that has evolved with it and this liquid HF is drained back into the cell. The applied D. C. cell voltage is in the range of approximately 4 to 6 volts. The conductivity of the electrolyte solution can be increased by adding a carrier electrolyte (conductivity additive), such as acetic anhydride, sodium fluoride or sulfuric acid, but this is not necessary.

A 40 or 50-ampere cell is adequate for the production of substantial quantities of product compounds for study, evaluation and limited usage, and such cells were used in performing most of the experiments reported below. The electrode pack comprises an alternating assemblage of iron plates as cathodes and nickel plates as anodes, spaced apart a distance of ⅛" to ¼", the total effective anode surface area in the 50-ampere cell being about 350 sq. in. (2.43 sq. ft.), and the normal current density during operation being in the neighborhood of 20 amperes per sq. ft. of anode area. For a more detailed description, see col. 9 of U. S. Patent No. 2,567,011 (September 4, 1951).

The following experimental examples serve to illustrate the preparation of the subject compounds and provide further data on their properties.

*Example 1*

A 40-ampere cell of the type described above was initially charged with 2000 grams of anhydrous liquid hydrogen fluoride and 80 grams of methanesulfonyl chloride, $CH_3SO_2Cl$, and both were replenished from time to time during the run of 46 hours to maintain the liquid level and an organic concentration of approximately 4%. The starting compound dissolved in the liquid HF and provided adequate conductivity. The cell was operated at atmospheric pressure and at a temperature of 15 to 17° C. The average current was approximately 40 amperes and the voltage was in the range of 5 to 6 volts, the average anode current density being approximately 20 amperes/sq. ft. During the run approximately 740 grams of methanesulfonyl chloride were consumed.

The gas mixture from the cell (after condensation of hydrogen fluoride that was drained back to the cell) was passed over sodium fluoride to remove residual HF and then condensed in a liquid air trap. The condensate weighed 1018 grams and was fractionally distilled to yield 634 grams of relatively pure trifluoromethanesulfonyl fluoride, $CF_3SO_2F$, having a boiling point of minus 23° C. The measured molecular weight (determined from vapor density) was 152, in agreement with the calculated formula weight of 152.

This sulfonic acid fluoride product compound is highly stable to hydrolysis in neutral and acidic aqueous solutions and cannot be directly hydrolyzed to the sulfonic acid in efficient yields. A 268 gram sample was hydrolyzed to the corresponding potassium salt by treatment in a pressure vessel with a 10% excess of an aqueous 20% potassium hydroxide solution, at 95° C. and 95 p. s. i. for 3 hours. The salt product was filtered from the reaction mixture and was recrystallized from ethyl alcohol, yielding 283 grams of relatively pure potassium trifluoromethanesulfonate, $CF_3SO_3K$, a white crystalline solid having a melting point of about 230° C. Analysis confirmed the identification (K: 22.2% found, 20.8% calc.; S: 15.9% found, 17.0% calc.). This salt is very stable in water and in alkaline solutions even at elevated temperatures up to at least 250° C. The anhydrous salt melts at about 230° C. and can be heated to at least 350° C. without decomposing at a substantial rate.

Trifluoromethanesulfonic acid, $CF_3SO_3H$, was prepared from the salt by distilling from excess 100% sulfuric acid. The acid is a colorless liquid material at room temperature, and has a boiling point of 166° C. The boiling point under a 3 mm. vacuum is 60° C. It is a very strong acid and is highly soluble in water, alcohols and ethers, but is only slightly soluble in carbon tetrachloride, benzene, heptane and fluorocarbons. It is soluble in acetone and ethyl acetate with discoloration of the solvent. Aqueous solutions of this acid are stable at temperatures up to at least 250° C.

The silver salt was prepared by slowly adding 11.5 grams (0.05 mole) of silver oxide to 15 grams (0.1 mole) of $CF_3SO_3H$ contained in a flask. Then 50 ml. of water was added and the mixture was heated until all of the silver oxide was consumed. The mixture was filtered and was evaporated to dryness on a hot plate. The residue was crystallized from benzene and the product, in the form of white needles, was oven-dried at 110–120° C. The yield of silver salt was 95%. Analysis showed 42.0% Ag (41.9% calc.) and 22.1% F (22.2% calc.).

The anhydride and the chloride of trifluoromethanesulfonic acid were prepared by slowly adding 65 grams (0.43 mole) of the acid to a flask containing 100 grams (0.48 mole) of $PCl_5$. Hydrogen chloride was evolved immediately. When this substantially ceased, the mixture was heated to 105° C. and the evolved gas mixture was collected in a trap cooled by a mixture of solid-$CO_2$ and acetone. The condensed reaction product mixture was slowly permitted to come to room temperature, the dissolved HCl being slowly expelled. The remaining material (61 grams) was fractionally distilled to yield 38 grams of trifluoromethanesulfonyl chloride, $CF_3SO_2Cl$, a liquid having a boiling point of about 33° C. (at 735 mm.), and 12 grams of trifluoromethanesulfonic anhydride $(CF_3SO_2)_2O$, a liquid having a boiling point of 80.5° C.

A small sample of the anhydride was dissolved in ether and treated with an excess of aniline. A white crystalline product was filtered out of the reaction mixture and was identified as the aniline salt of trifluoromethanesulfonic acid, $CF_3SO_3H \cdot H_2NC_6H_5$, having a M. P. of about 250–255° C. The ethereal filtrate was washed with dilute hydrochloric acid to remove any unreacted aniline and was then evaporated to dryness. A white solid was obtained which was identified as N-phenyl trifluoromethanesulfonamide, $CF_3SO_2NHC_6H_5$, having M. P. of 65–66° C. The same products were also obtained by reacting trifluoromethanesulfonyl chloride with aniline. A wide variety of other substituted trifluoro sulfonamides have been made by reacting trifluoromethanesulfonyl chloride or fluoride with various saturated and unsaturated amines in a 1:2 mol ratio in ether solvent, filtering, washing with dilute hydrochloric acid and then with water, and distilling (or evaporating) off the solvent. The residue can be readily purified by sublimation or distillation. Benzene has also been employed as a solvent when a sulfonyl chloride starting compound is used. The same procedure can be employed with higher members of the starting compound series and therefore has general application for making substituted sulfonamide derivatives.

Trifluoromethanesulfonamide, $CF_3SO_2NH_2$, was prepared by slowly adding $CF_3SO_2Cl$ to an excess of liquid ammonia contained in a flask cooled by a mixture of solid-$CO_2$ and acetone. Stirring was continued and then the excess ammonia was allowed to evaporate off. The solid residue was the desired sulfonamide, and had a melting point of 117–119° C.

The preparation of ester derivatives is illustrated by an experiment in which methyl trifluoromethanesulfonate was prepared from the silver salt of trifluoromethanesulfonic acid. To 100 ml. of methyl iodide was added 77.1 grams of the silver salt and the mixture was stirred for two hours. The precipitate of silver iodide (69.2 grams, 98.4% of theoretical) was filtered off and was washed with 20 ml. of methyl iodide. The methyl iodide filtrate and washing were combined and subjected to fractional distillation, yielding 33.8 grams (69% yield) of the desired ester, $CF_3SO_2OCH_3$, a liquid having a boiling point of 97–97.5° C. (at 736 mm.) and a refractive index at 25° C. of 1.3238. This ester hydrolyzes very rapidly and turns dark upon exposure to atmospheric moisture at room temperature. However, a sample kept in a tightly stoppered container in a refrigerator showed no apparent decomposition at the end of six months.

The preparation of sulfone derivatives from Grignard reagents is illustrated by an experiment in which methyl trifluoromethanesulfone was prepared from trifluoromethanesulfonyl fluoride. Methyl magnesium iodide (0.5 mole) dissolved in ether was prepared in a reaction flask fitted with a reflux condenser cooled with a mixture of solid-$CO_2$ and acetone and provided with an inlet bubbler. With the ether solution refluxing, 40.0 grams (0.26 mole) of $CF_3SO_2F$ was slowly bubbled through the solution. Some of the sulfonyl fluoride apparently dissolved in the ethereal solution but most of it was condensed and dripped back into the reaction flask. After the reaction appeared to be complete, the reaction mixture was allowed to stand over night. The reaction mixture was hydrolyzed with dilute hydrochloric acid (a mixture of 50 ml. water and 30 ml. concentrated hydrochloric acid). The ethereal layer was dried over anhydrous calcium sulfate. After removing the ether by distillation, the liquid residue (13.7 grams) was fractionated to give 8.2 grams of the desired sulfone, $CF_3SO_2CH_3$, having a boiling point of 130° C. (745 mm.) and a refractive index at 25° C. of 1.3462, and 1.9 grams of $CF_3SO_2CH_2SO_2CF_3$, a disulfone by-product, having a boiling point of 191° C. (745 mm.).

*Example 2*

The same electrofluorination procedure was followed as in the preceding example, except that the starting compound was ethanesulfonyl chloride, $CH_3CH_2SO_2Cl$, of which 735 grams were consumed during the run of 41 hours. A 50-ampere cell was used, and was operated at approximately 50 amperes and 5 volts throughout the run. The perfluorinated product compound, perfluoroethanesulfonyl fluoride, $CF_3CF_2SO_2F$, has a boiling point of 7.5° C. The corresponding potassium salt, potassium perfluoroethanesulfonate, $CF_3CF_2SO_3K$, was prepared by hydrolysis with 50% aqueous KOH at 150° C. under 90 p. s. i. pressure, and this salt was converted to the acid by distillation from excess 100% sulfuric acid, the yield of acid being 310 grams. The neutral equivalent value was 201, in close agreement with the calculated value of 200 for this acid. The anhydrous salt melts at about 300° C. and can be heated to at least 425° C. without decomposing at a substantial rate.

This perfluoroethanesulfonic acid, $CF_3CF_2SO_3H$, is a colorless liquid at room temperature and has a boiling point of 175° C. and a vacuum boiling point of 81° C. at 21.5 mm. pressure. The surface tension at 25° C. is 21 dynes/cm. It has properties similar to those of the trifluoromethanesulfonic acid discussed above, and the same is true as to the respective salts, sulfonyl fluoride, sulfonyl chloride, and sulfonamide. Aqueous solutions of this acid showed negligible decomposition when heated in a glass-lined autoclave at 250° C. for 3½ hours.

Vapor phase pyrolysis of the acid in an empty carbon-lined tube at 475° C. resulted in approximately 60% conversion to $SO_2$, $CF_3COF$, $COF_2$ and n-$C_4F_{10}$.

These acids are strong salt-forming acids and readily react with concentrated aqueous solutions of metal and ammonium hydroxides (or oxides) to form the corresponding salt, which precipitates out and is recovered and dried. Thus the sodium salt was obtained on reaction with NaOH, the lithium salt upon reaction with LiOH, the silver salt upon reaction with $Ag_2O$, and the strontium salt upon reaction with $Sr(OH)_2$.

The sodium perfluoroethanesulfonate salt,

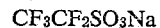

$CF_3CF_2SO_3Na$ has a melting point of 370 to 390° C. and does not appreciably decompose until a temperature of at least 420° C. is reached. It is very resistant to neutral and alkaline hydrolysis—aqueous solutions showed negligible decomposition when heated in a glass-lined autoclave at 250° C. for 3½ hours. Heating of the salt in excess of 0.5 N sodium hydroxide solution at 150° C. for 16 hours resulted in only slight decomposition (loss of 0.9 meq. F/mole).

The dry $CF_3CF_2SO_3Li$, $CF_3CF_2SO_3Ag$ and

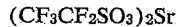

$(CF_3CF_2SO_3)_2Sr$ salts showed little evidence of decomposition when heated up to temperatures in the 350–400° C. The silver salt melted at 265–290° C.

*Example 3*

A 40-ampere cell was charged with 1950 grams of anhydrous liquid hydrogen fluoride and 120 grams of isopentanesulfonyl chloride, $(CH_3)_2CH(CH_2)_2SO_2Cl$, both of which were replenished during the run of 106 hours. The cell was operated at atmospheric pressure, a temperature of 18° C., 40 amperes and 5–6 volts. The perfluorinated product settled to the bottom of the cell. From fractional distillation of 695 grams of cell drainings there was obtained 380 grams of perfluoro-n-pentanesulfonyl fluoride, $CF_3(CF_2)_4SO_2F$, which is liquid at room temperature and has a boiling point of 89–91° C., and a refractive index of 1.2881 at 25° C.

Refluxing with the theoretical amount of 15% aqueous KOH for 4 hours yielded the potassium salt which was isolated as a white crystalline solid, identified as $CF_3(CF_2)_4SO_3K$. (Analysis showed K: 10.7% found, 10.1% calc.; S: 8.13% found, 8.25% calc.) This salt is sparingly soluble in water (3% at 25° C.), showing the effect of the fluorocarbon chain length in decreasing solubility with increase in number of carbon atoms. It is stable at temperatures up to 350–400° C.

The corresponding free acid was obtained as essentially the monohydrate by distilling the salt from excess 98% sulfuric acid. The hydrated acid, perfluoro-n-pentanesulfonic acid monohydrate, $CF_3(CF_2)_4SO_3H \cdot H_2O$, is a white solid at room temperature and has a melting point of 129–130° C., a boiling point of 212° C., and a vacuum boiling point of 110° C. at 5 mm. pressure. It is moderately soluble in water and exhibits surface activity. The surface tension of aqueous solutions is markedly reduced; the point of micelle formation at 25° C. being at a concentration of 3.7%, and at this concentration the surface tension is 39 dynes/cm. (as compared to 72 dynes/cm. for pure water).

*Example 4*

A 40-ampere cell was charged with 1950 grams of anhydrous liquid hydrogen fluoride and 200 grams of n-hexanesulfonyl chloride, $CH_3(CH_2)_5SO_2Cl$, and during the run of 50 hours the organic concentration was maintained at about this 10% concentration by periodic additions. The cell was operated at atmospheric pressure, a temperature of 20–24° C., 40 amperes and 5–6 volts. The perfluorinated product settled to the bottom of the cell. From fractional distillation of 592 grams of cell drainings there was obtained 329 grams of perfluoro-n-hexanesulfonyl fluoride, $CF_3(CF_2)_5SO_2F$, a liquid having a boiling point of 114–115° C. and a refractive index of 1.2918 at 25° C.

Refluxing of 79 grams thereof with an equal weight of 50% aqueous KOH for 4 hours yielded 70 grams of crude potassium salt, $CF_3(CF_2)_5SO_3K$, which is only sparingly soluble in water. Distillation from 100% sulfuric acid of 50 grams of the crude salt yielded 33 grams of perfluoro-n-hexanesulfonic acid, $CF_3(CF_2)_5SO_3H$, a white solid material having a boiling point at 3.5 mm. of 95° C. The neutral equivalent value was 390 (calc. 400). This acid is moderately soluble in water and shows marked surface activity.

*Example 5*

A 40-ampere cell was charged with 1950 grams of anhydrous liquid hydrogen fluoride and 200 grams of n-octanesulfonyl chloride, $CH_3(CH_2)_7SO_2Cl$. The organic concentration rose to about 20% during the 80 hour run. The cell was operated at atmospheric pressure, a temperature of 17–19° C., 5–6 volts, and an average anode current density of about 20 amperes/sq. ft.

Fractionation of 498 grams of high-boiler cell drainings yielded 162 grams of perfluoro-n-octanesulfonyl fluoride, $CF_3(CF_2)_7SO_2F$, a liquid having a boiling point of 154.5° C. (at about 744 mm.) and a refractive index of 1.2993 at 25° C.

Hydrolysis of a sample by refluxing with an equal weight of 50% aqueous KOH for 4 hours, gave an 82% yield of the potassium salt, $CF_3(CF_2)_7SO_3K$, potassium perfluoro-n-octanesulfonate. (Analysis showed K: 7.96% found, 7.24% calc.; S: 5.65% found, 5.94% calc.) This salt is only very slightly soluble in water. It is very stable in neutral and alkaline solutions even at elevated temperatures; in acid solutions it gradually hydrolyzes to the corresponding acid. It has very pronounced surface activity and substantially reduces the surface tension of aqueous solutions.

Distillation of a sample of this salt from 100% $H_2SO_4$ gave a 79% yield of the corresponding acid, perfluoro-n-octanesulfonic acid, $CF_3(CF_2)_7SO_3H$, a white solid material having a boiling point of 249° C. and a vacuum boiling point of 133° C. at 6 mm. pressure. (It is of interest to compare this boiling point with that of the corresponding carboxylic acid containing an 8-carbon fluorocarbon chain, $CF_3(CF_2)_7COOH$, which is much lower boiling, having a boiling point of about 200° C.) This acid is moderately soluble in water but has a very pronounced surface activity, as illustrated by the surface tension behavior of aqueous solution. The point of micelle formation at 25° C. is at a concentration of only 0.22%, at which the surface tension of the solution is 35 dynes/cm. This acid is very stable in neutral and acidic solutions even at elevated temperatures and even under strongly oxidizing conditions, and has value as a stable surface active agent even under these extreme conditions. Aqueous solutions of the acid are stable at temperatures up to at least 250° C. The addition of 1.0% by weight of this perfluoro acid to 90% $HNO_3$ (white fuming nitric acid) reduced the surface tension from 45 dynes/cm. (pure nitric acid) to 36 dynes/cm.; and the addition of 5% reduced the value to 28 dynes/cm. After ten weeks of standing at room temperature the surface tensions were measured and no change was found, thus illustrating the stability of this perfluoro acid toward oxidation.

The powerful surface active properties of perfluoro-n-octanesulfonic acid in oils and hydrocarbon media is illustrated by the following data: The surface tension of a kerosene at 25° C. was reduced from 26.0 dynes/cm. to 20.5 by addition of only 0.04% by weight of the acid; and the surface tension of a refined mineral oil at 25° C. was reduced from 30.7 dynes/cm. to 23.4 by addition of 0.01% acid. The surface tensions of benzene, toluene, xylene and perchloroethylene were each diminished by 5 to 6 dynes/cm. at 25° C. upon addition of 0.1% or less of the acid.

The silver salt of this acid was successfully prepared by the same method previously described under Example 1 for making the salt of the methane acid. Analysis showed 17.4% Ag (calc. 17.8%). It is a stable high-melting compound.

Reaction of the acid with $PCl_5$ yielded both the anhydride, $(n-C_8F_{17}SO_2)_2O$, B. P. 260–275° C., and the sulfonyl chloride, $CF_3(CF_2)_7SO_2Cl$, B. P. 194° C., refractive index at 25° C. of 1.3200. The latter had a strong infrared absorption band at 7.00 microns, which is typical of the perfluoro sulfonyl chlorides.

A wide variety of substituted sulfonamide derivatives have been prepared by reacting the acid anhydride, fluoride and chloride, with amines which are fairly strong bases. For example, the anhydride was reacted with p-toluidine to obtain $n-C_8F_{17}SO_2NH \cdot C_6H_5 \cdot CH_3$, having a melting point of 93–95° C.; and the fluoride was reacted with piperidine to obtain $n-C_8F_{17}SO_2—NC_5H_{11}$, having a melting point of 75–76.5° C., with morpholine to obtain $n-C_8F_{17}SO_2—NC_4H_8O$, having a melting point of 127–129° C., and with allyl amine to obtain $$n-C_8F_{17}SO_2NHCH_2CH:CH_2$$

having a melting point of 84.8–85.5° C.

The n-perfluorooctanesulfonamide was prepared by slowly dropping 5.3 grams of $CF_3(CF_2)_7SO_2F$ into 25 ml. of liquid ammonia contained in a flask cooled by a mixture of solid-$CO_2$ and acetone. Stirring was continued for a while and then the excess ammonia was allowed to evaporate off. A white solid residue was obtained which weighed 5.7 grams after being dried under reduced pressure, and which was dissolved in ether, causing evolution of ammonia. The ammonium fluoride precipitate was filtered off and the filtrate was evaporated to dryness. The crude sulfonamide weighed 4.7 grams (90% yield) and was purified by two recrystallizations from chloroform. The purified $CF_3(CF_2)_7SO_2NH_2$ product melted at 151–152° C. Analysis showed 2.81% N (calc. 2.81%) and 19.1% C (calc. 19.2%).

Still higher members of the series of perfluoro-n-alkanesulfonyl fluorides can be made by the electrochemical process and the following table shows the approximate boiling points of compounds containing up to 18 carbon atoms in the molecule:

| Compound: | B. P. (° C.) |
|---|---|
| $CF_3(CF_2)_9SO_2F$ | 190 |
| $CF_3(CF_2)_{11}SO_2F$ | 222 |
| $CF_3(CF_2)_{13}SO_2F$ | 250 |
| $CF_3(CF_2)_{15}SO_2F$ | 275 |
| $CF_3(CF_2)_{17}SO_2F$ | 295 |

The corresponding salts and sulfonic acids can be made from these fluorides.

Using the same procedures, phenylmethanesulfonyl chloride, $C_6H_5CH_2SO_2Cl$, can be employed as the starting compound for making perfluoro(cyclohexylmethane)sulfonyl fluoride, $C_6F_{11}CF_2SO_2F$, the corresponding potassium salt, $C_6F_{11}CF_2SO_3K$, and the corresponding sulfonic acid, $C_6F_{11}CF_2SO_2H$ (perfluoro(cyclohexylmethane)sulfonic acid), which have a stable fluorocarbon structure composed of seven perfluorinated carbon atoms, and have properties similar to those noted above for the open-chain compounds, including surface active properties. In these compounds it will be noted that the molecule contains a perfluorinated cyclohexyl ring but the sulfur atom is bonded to a bridging acyclic carbon atom rather than being directly bonded to the ring. The electrochemical process can also be employed for making the higher members of this series of sulfonyl fluorides, $C_6F_{11}(CF_2)_nSO_2F$, from which the corresponding salts and sulfonic acids can be made.

The following examples illustrate compounds that contain a perfluorinated cyclohexyl ring in the molecule to which the sulfur atom is directly bonded, thus being directly united to a cyclic carbon atom of a ring.

*Example 6*

A 40-ampere cell was charged with 1950 grams of anhydrous liquid hydrogen fluoride and 120 grams of p-toluenesulfonyl chloride, $p\text{-}CH_3C_6H_4SO_2Cl$, and additions were made during the run. The organic concentration increased from the initial 6% to a value of 30% during the run. The cell operated at atmospheric pressure, a temperature of 17° C., 35 amperes and 5.5 volts.

The cell drainings (500 grams) were refluxed with an equal weight of 50% aqueous KOH and the crude salt was purified by recrystallization from cold water, yielding 63 grams of relatively pure potassium perfluoro(4-methylcyclohexane)sulfonate salt, $4\text{-}CF_3C_6F_{10}SO_3K$. (Analysis showed K: 9.03% found, 8.66% calc.; S: 6.92% found, 7.12% calc.) The dry salt was found to be stable at temperatures up to at least 300° C. It is only slightly soluble in water (1.3% at 25° C.). The stability of this salt is further shown by an experiment wherein a purified sample was refluxed for 30 hours in excess 15% aqueous KOH, and was almost quantitatively recovered.

Distillation of 40 grams of the salt from excess 100% sulfuric acid yielded 28.4 grams of relatively pure perfluoro(4-methylcyclohexane)sulfonic acid, $4\text{-}CF_3C_6F_{10}SO_3H$, having the structural formula:

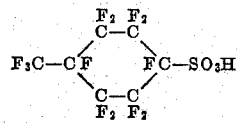

It will be noted that the sulfur atom is directly bonded to a cyclic carbon atom; nevertheless, this acid is very stable in aqueous solutions even at elevated temperatures (up to at least 250° C.), in striking contrast to the behavior of the perfluoro cyclohexanecarboxylic acids which decompose in aqueous solutions even at room temperature. This acid is a white solid at room temperature and has a boiling point of 240° C. and a vacuum boiling point of 120° C. at 3 mm. It is moderately soluble in water, methanol and ether, but is only slightly soluble in carbon tetrachloride and in hydrocarbons and fluorocarbons. It has marked surface activity. The point of micelle formation in aqueous solutions at 25° C. is at a concentration of 1.4% and at this concentration the surface tension is 33 dynes/cm. The corrosion of aluminum in hydrochloric acid was found to be strongly inhibited by the addition of this perfluoro acid.

The sodium salt, $4\text{-}CF_3C_6F_{10}SO_3Na$, is a white crystalline material which is slightly soluble in water and is very stable. The anhydrous salt is stable to decomposition at temperatures up to about 390° C. The ammonium salt, $4\text{-}CF_3C_6F_{10}SO_3NH_4$, is stable at temperatures up to about 300° C. The silver salt has been found stable at temperatures up to about 300° C.

The acid fluoride compound, perfluoro(4-methylcyclohexane)sulfonyl fluoride, $4\text{-}CF_3C_6F_{10}SO_2F$, is liquid at room temperature and has a boiling point of 131.5° C.

The refractive index at 25° C. is 1.318. It is very stable in neutral and acid solutions, even at elevated temperatures.

Using the same procedures, benzenesulfonyl chloride, $C_6H_5SO_2Cl$, can be employed as the starting compound for making perfluorocyclohexanesulfonyl fluoride, $$C_6F_{11}SO_2F$$

having a boiling point of 100–105° C., the potassium perfluorocyclohexanesulfonate salt, $C_6F_{11}SO_3K$, and the perfluorocyclohexanesulfonic acid, $C_6F_{11}SO_3H$, which have properties similar to those of the corresponding trifluoromethyl compounds mentioned above, including surface active properties which are, however, less pronounced owing to the absence of the terminal trifluoromethyl group. This $C_6F_{11}SO_2F$ sulfonyl fluoride is also obtainable as a by-product when a toluene sulfonyl halide starting compound is used, owing to cleavage of the methyl group in the case of some molecules.

*Example 7*

Using similar procedures, isomers of the trifluoromethyl compounds described in Example 6 were made using o-toluenesulfonyl chloride, $o\text{-}CH_3C_6H_4SO_2Cl$, as the starting compound. In this case the trifluoromethyl group is bonded to a carbon atom adjacent to the carbon atom to which the sulfur atom is bonded. Thus the acid has the structural formula:

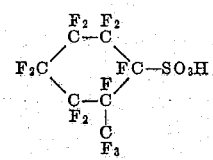

The acid fluoride compound, obtained from the cell drainings, was identified as perfluoro(2-methylcyclohexane)sulfonyl fluoride, $2\text{-}CF_3C_6F_{10}SO_2F$, a liquid having a boiling point of 131° C. and a refractive index at 25° C. of 1.318. The corresponding potassium salt, $$2\text{-}CF_3C_6F_{10}SO_3K$$

and the acid, $2\text{-}CF_3C_6F_{10}SO_3H$, have physical properties similar to those of the 4-methyl compounds of the preceding example but are somewhat less stable and less surface active.

*Example 8*

Using similar procedures, compounds were made that are next higher in the series to the trifluoromethyl compounds of Example 6, having a terminal pentafluoroethyl group instead of a trifluoromethyl group, using p-ethylbenzenesulfonyl chloride, $p\text{-}C_2H_5C_6H_4SO_2Cl$, as the starting compound.

The acid fluoride compound, obtained from the cell drainings, was identified as perfluoro(4-ethylcyclohexane)sulfonyl fluoride, $4\text{-}C_2F_5C_6F_{10}SO_2F$, a stable liquid having a boiling point of 150–151° C. and a refractive index at 25° C. of 1.321. The corresponding potassium salt, $4\text{-}C_2F_5C_6F_{10}SO_3K$, is only very slightly soluble in water, and the anhydrous salt is relatively stable at temperatures up to about 200° C. The corresponding acid, perfluoro(4-ethylcyclohexane)sulfonic acid, $4\text{-}C_2F_5C_6F_{10}SO_3H$, is a white solid material and is moderately soluble in water. It has a higher degree of surface activity than does the $4\text{-}CF_3C_6F_{10}SO_3H$ acid owing to the greater length of the fluorocarbon chain structure (fluorocarbon "tail").

Similarly, p-isopropylbenzenesulfonyl chloride has been used as the cell starting compound for making perfluoro(4-isopropylcyclohexane)sulfonyl fluoride, $$4\text{-}(CF_3)_2CFC_6F_{10}SO_2F$$

a stable liquid having a boiling point of 170° C. and a refractive index (at 25° C.) of 1.323, employed for making the corresponding potassium salt and acid.

p-Sec-butylbenzenesulfonyl chloride has been used as the cell starting compound for making perfluoro(4-sec-butylcyclohexane)sulfonyl fluoride, $$4\text{-}(C_2F_5)(CF_3)CFC_6F_{10}SO_2F$$

a stable liquid having a boiling point of about 190° C., employed for making the corresponding potassium salt and acid.

Still higher members of the series can be made. Thus the 18-carbon compounds can be made using p-dodecylbenzenesulfonyl chloride, p-$C_{12}H_{25}C_6H_4SO_2Cl$, as the starting compound for making the perfluoro(4-dodecylcyclohexane)sulfonyl fluoride, 4-$C_{12}F_{25}C_6F_{10}SO_2F$, having a boiling point of the order of 300° C., from which the corresponding potassium salt and acid can be made.

*Example 9*

This example illustrates the use of sulfonyl fluoride starting compounds.

40-ampere cell was charged with 2000 g. of anhydrous liquid hydrogen fluoride and 200 g. of n-octanesulfonyl fluoride, $CH_3(CH_2)_7SO_2F$. The cell was operated at atmospheric pressure, a temperature of 18–20° C., 5.7–6.0 volts and an average anode current density of 20 amperes/sq. ft. During the run of 69 hours, 470 g. of n-octanesulfonyl fluoride was consumed. Fractional distillation of 509 g. of high-boiler cell drainings yielded 298 g. of perfluoro-n-octanesulfonyl fluoride, $CF_3(CF_2)_7SO_2F$.

PREPARATION OF STARTING COMPOUNDS

The aryl sulfonyl chloride starting compounds can be made directly from the corresponding aromatic hydrocarbon and chlorosulfonic acid by well known procedures. The aryl sulfonyl fluoride starting compounds can be made in a similar way by using fluorosulfonic acid.

The aliphatic sulfonyl chloride starting compounds can be made by starting with the corresponding alkyl bromide and converting it to the sodium sulfonate salt with aqueous sodium sulfite, and reacting the salt with phosphorous pentachloride, using well known procedures. The corresponding sulfonyl fluoride can be made by reacting the sulfonyl chloride with aqueous potassium fluoride.

We claim:

1. The new and useful fluorocarbon compounds of the class consisting of the saturated fluorocarbon sulfonic acids represented by the formula:

$$R_fSO_3H$$

where "$R_f$" is a saturated fluorocarbon structure containing 1 to 18 carbon atoms, each of which is present in a group of the class consisting of perfluoroalkyl and perfluorocyclohexyl groups, and the corresponding acid anhydrides, metal and ammonium salts, acid fluorides, acid chlorides, and sulfonamides.

2. The compounds of claim 1 which have 5 to 18 carbon atoms in the molecule.

3. The compounds of claim 1 which have a normal chain of eight carbon atoms in the molecule.

4. Trifluoromethanesulfonic acid, having the formula $CF_3SO_3H$.

5. Potassium trifluoromethanesulfonate, having the formula $CF_3SO_3K$.

6. Potassium perfluoro(4-ethylcyclohexane)sulfonate, having the formula 4-$C_2F_5C_6F_{10}SO_3K$.

7. Perfluoro-n-octanesulfonic acid, having the formula $CF_3(CF_2)_7SO_3H$.

8. Potassium perfluoro-n-octanesulfonate, having the formula $CF_3(CF_2)_7SO_3K$.

9. A new and useful electrochemical process of making saturated fluorocarbon sulfonic acid fluoride compounds which comprises electrolyzing a mixture of liquid hydrogen fluoride and a hydrocarbon sulfonic acid halide in a nickel-anode cell at a voltage of approximately 4 to 6 volts, and usefully recovering a perfluorinated and saturated fluorocarbon sulfonic acid fluoride product of the process.

10. A new and useful electrochemical process of making saturated fluorocarbon sulfonic acid fluoride compounds which comprises electrolyzing a mixture of liquid hydrogen fluoride and a hydrocarbon sulfonic acid fluoride in a nickel-anode cell at a voltage of approximately 4 to 6 volts, and usefully recovering a perfluorinated and saturated fluorocarbon sulfonic acid fluoride product of the process.

References Cited in the file of this patent

UNITED STATES PATENTS

| | | |
|---|---|---|
| 2,403,207 | Barrick | July 2, 1946 |
| 2,519,983 | Simons | Aug. 22, 1950 |
| 2,702,306 | Gall et al. | Feb. 15, 1955 |

FOREIGN PATENTS

| | | |
|---|---|---|
| 546,354 | Germany | Mar. 12, 1932 |

OTHER REFERENCES

Schechter et al.: J. Chem. Soc. (London), vol. 63, pp. 1764–5 (1941).